US009246917B2

(12) United States Patent
Yerli

(10) Patent No.: US 9,246,917 B2
(45) Date of Patent: Jan. 26, 2016

(54) LIVE REPRESENTATION OF USERS WITHIN ONLINE SYSTEMS

(71) Applicant: Crytek IP Holding LLC, Wilmington, DE (US)

(72) Inventor: Cevat Yerli, Frankfurt/Main (DE)

(73) Assignee: Crytek IP Holding LLC, Wilmington, DE (US)

( * ) Notice: Subject to any disclaimer, the term of this patent is extended or adjusted under 35 U.S.C. 154(b) by 10 days.

(21) Appl. No.: 13/760,000

(22) Filed: Feb. 5, 2013

(65) Prior Publication Data

US 2013/0205408 A1    Aug. 8, 2013

Related U.S. Application Data

(60) Provisional application No. 61/595,642, filed on Feb. 6, 2012.

(51) Int. Cl.
*G06F 17/30* (2006.01)
*H04N 7/16* (2011.01)
*H04L 29/06* (2006.01)
*G06F 21/62* (2013.01)
*G06F 11/30* (2006.01)

(52) U.S. Cl.
CPC ............ *H04L 63/10* (2013.01); *G06F 21/6245* (2013.01); *G06F 21/6254* (2013.01); *G06F 21/6263* (2013.01)

(58) Field of Classification Search
USPC .......... 713/168–174, 182–186, 202; 709/225, 709/229; 726/2–8
See application file for complete search history.

(56) References Cited

U.S. PATENT DOCUMENTS

| 2007/0143475 | A1  | 6/2007 | Daigle |
| 2008/0104679 | A1* | 5/2008 | Craig .................... H04L 67/306 726/4 |
| 2008/0195702 | A1  | 8/2008 | Matz |
| 2009/0125521 | A1  | 5/2009 | Petty |
| 2010/0015976 | A1  | 1/2010 | Issa |
| 2011/0029871 | A1* | 2/2011 | Schifone ........... G06F 17/30056 715/716 |

FOREIGN PATENT DOCUMENTS

| CN | 101702795 A    | 5/2010 |
| WO | 2009/035618 A2 | 3/2009 |

OTHER PUBLICATIONS

Yerli, C., "Management of Online Content in a Network," U.S. Appl. No. 13/609,046, filed Sep. 10, 2012.

(Continued)

*Primary Examiner* — Evans Desrosiers
(74) *Attorney, Agent, or Firm* — Christensen O'Connor Johnson Kindness PLLC

(57) ABSTRACT

The present disclosure relates to representation of users within online systems, such as social networks, online services, and platforms. A method for representing a user within an online system is provided, comprising receiving by the online system a live recording of a first user of the online system, the first user defining permissions to access the live recording; requesting a representation of the first user by a second user of the online system; determining if the second user is authorized to access the live recording based on the permissions; and if the second user is authorized, providing the live recording to the second user as the representation of the first user. Furthermore, an online system and a data structure representing a user of an online system are defined.

19 Claims, 6 Drawing Sheets

(56) References Cited

OTHER PUBLICATIONS

Yerli, C., "Privacy-Based Identity," U.S. Appl. No. 13/689,550, filed Nov. 29, 2012.
Yerli, C., "Live Bar," U.S. Appl. No. 13/749,605, filed Jan. 24, 2013.
Yerli, C., "Timer-Based Initiation of Server-Based Actions," U.S. Appl. No. 13/759,962, filed Feb. 5, 2013.
Ryutov, T., and C. Neuman, "Unified Model to Support Authorization in a Wide Range of Applications, Including Metacomputing, Remote Printing, Video Conference," USC/Information Sciences Institute, Internet Draft Version 03 (draft-ietf-cat-acc-cntrl-frmw-03.txt), Mar. 9, 2000, 18 pages.
European Search Report dated May 22, 2013, in European Application No. 13 15 3959.5, filed Feb. 5, 2013, 7 pages.
The First Office Action mailed Jun. 17, 2015, issued in corresponding Chinese Application No. 201310046317.4, filed Feb. 5, 2013, 16 pages.

* cited by examiner

LIVE REPRESENTATION OF USERS WITHIN ONLINE SYSTEMS

CROSS-REFERENCE TO RELATED APPLICATION

This application claims the benefit of U.S. Provisional Patent Application No. 61/595,642, filed Feb. 6, 2012, the disclosure of which is incorporated by reference herein in its entirety.

TECHNICAL FIELD

The present invention relates to a method for representing a user within an online system.

BACKGROUND

Online systems, platforms, and services, such as social networks, online communities, and communication platforms, which enable online and networked interactions between users and activities of the users, typically represent a registered user by a profile defining the user's name and image. The online system typically allows other registered users of the online system as well as unregistered public viewers exploring the online system to access the profiles and view the respective details. Yet, profiles are generally presented as a kind of register or phone book consisting of static data, and typically do not comprise any information of the user that reflects the current behavior, mood, status, and/or activities of the user.

Providing detailed data to viewers or other users may even be undesirable since sensitive data may be retrieved by a large group of viewers without any control by the owner of the personal data. Thus, a user of an online system may withhold details regarding the user's identity as a precaution. However, limited and static data in user profiles may decrease the user experience and acceptance of the online platform, since the level of communication and interaction is limited.

A higher level of communication between users may, for example, be achieved by a chat, such as a video chat session between two communication parties. Each participant may directly communicate with others and may receive an immediate visual and audio feedback related to, for example, facial expressions, gestures, etc. Yet, video chats are typically established between specific parties, for example, after one party has retrieved the contact information and started the chat session using the contact information. Thus, video chats are explicitly established between the communication parties and therefore generally unsuitable to represent a live update of a user of an online system to other users of the online system.

SUMMARY

The present disclosure relates to a method for representing a user within an online system and a respective online system. In particular, the present invention relates to a live representation of a user comprising a live recording of the user. The present disclosure describes an improved representation of users in online systems. For example, a described user representation improves instantaneous interaction between the user and a respective viewer of the representation. Furthermore, a computer-readable medium and a data structure are described.

The method for representing a user within an online system comprises the steps of receiving by the online system a live recording of a first user of the online system, wherein the first user defines permissions to access the live recording. The representation of the first user is requested by a second user of the online system. The method includes determining if the second user is authorized to access the live recording based on the permissions. If the second user is authorized, the live recording is provided to the second user as the representation of the first user.

The live recording may be provided to the online system as a live media stream, such as a live video stream. The first user may, for example, use a web cam or an integrated video or image camera in a mobile device to generate a stream of visual data showing the environment of the terminal of the user, which may, for example, be enhanced with audio data as well as other multimedia data and further information, for example, regarding a status set by or automatically determined for the first user. The live recording is received by the online system and may be buffered or otherwise stored for a certain amount of time. The first user may explicitly define groups of users, characteristics of users, and other or general rules specifying users which are allowed to access the live recording. The online system is configured to guarantee that the live recording is provided only to those viewers that are authorized to access the live recording by the respective permissions and rules set by the first user.

The second user may request a representation of the first user, for example, by accessing a profile of a registered user or by accessing content related to the registered user, such as by observing current activities on the online system. In general, any content and activity and further interrelations between content and activities may be represented as a structure or container, also referred to as a seed in the following specification. A structure of the container or seed applicable in the method is disclosed in co-pending U.S. patent application Ser. No. 13/609,046, entitled "Management of Online Content in a Network," filed on Sep. 10, 2012, which claims the benefit of U.S. Provisional Application No. 61/533,842, filed on Sep. 13, 2011, the entire disclosures of which are incorporated herein by reference.

The content, activities, and each seed may be tagged or marked with some indications referring to the users owning the content or being involved in the activity, respectively. For example, the content or activity may be presented by a combination of an icon and at least one nickname referring to the respective owners or participants. By clicking on or otherwise selecting or triggering the icon and/or the nickname, the second user may be provided with further information on the content or activity as well as information related to the user. Thus, the online system may receive the click or selection by the second user and may determine the users related to the content or activity. Hence, if the second user accesses a seed related to the first user, the online system receives or generates a request to access a representation of the first user to be presented with the accessed seed. The online system or a connected processing component may determine if the second user has the permissions or rights to access the live recording and, if so, the online system provides the live recording to the second user, for example, in combination with the content or an action description related to the accessed seed. In particular, if it is determined that the second user has sufficient rights to access the live recording, the online system may directly provide the received and potentially buffered live recording to the second user as the user representation, also called "Live Profile" hereinafter. Also, if multiple users are provided with the live recording, the online system may apply a broadcasting approach or any suitable approach to provide a live recording of one user to a plurality of users simultaneously.

The inventive method allows for an enhanced and secure representation of users within an online system. It enables instantaneous feedback on current user actions and status of the user without a need to establish a communication session in advance. Rather, the first user may explicitly define a group of users which are granted access to the detailed audio and/or visual representation, and these users are immediately provided with the respective live recording by the online system without any further requirements.

In a representative embodiment, the live recording is provided in an area representing a user icon of the first user. The respective area which is requested or accessed by the second user may also be configured to dynamically change whenever the first user connects to the online system and provides the live recording. For example, a user connected to a social network can enable a local web camera to enable a Live Profile, comprising his video and potentially an audio stream, within the network. This will result in an instantaneous video picture update in his profile, which may be specifically displayed as his profile icon or his picture icon to authorized viewers. For example, the Live Profile may be displayed in combination with the user name in a location of the social network, where the user previously added content or initiated an activity.

According to a representative embodiment, the method further comprises initiating an activity between the first and second users in response to an interaction of the second user with the representation. For example, the online system may be configured to present the live recording or Live Profile to the second user instead of a user icon of the first user as a video stream without any audio data, showing live images of the first user only. The second user may, for example, interact with the representation in order to receive an audio output corresponding to the video stream, such as audio data of the live recording. Yet, the second user may also start any other action enabled by the online system, such as a video chat with the first user or another activity involving the first user. The first user may be required to explicitly define actions which are available to other users that trigger or interact with his Live Profile. Also, the available actions may be defined by the online system and may also depend on the type of content presented in combination with the user representation. The initiated activity may be directly related or adapted to the user representation or Live Profile. For example, a visual output of the activity may be presented in proximity of the Live Profile or may even replace the respective Live Profile. Thus, in relation to a corresponding full activity, the functionality and input/output capabilities of the initiated activity may be particularly adapted to the corresponding Live Profile.

According to another embodiment, said interaction comprises at least one of clicking on the representation and hovering over the representation. The second user viewing the Live Profile of the first user may, for example, hover the mouse or another control device over the Live Profile to initiate a video chat with the first user without any further interaction. Such video chat may be represented to the second user at the location of the Live Profile, wherein the video display is processed as a small icon, thereby generating an "in place" chat. During the "in place" chat, both participants may see and hear each other. Also, the "in place" chat, may provide the respective audio and video data to all other users who are hovering a mouse or control device over a respective Live Profile of the first user or triggering the Live Profile in another suitable way. Thus, the online system may broadcast the video and audio data of the live recording and the associated "in place" chat nonexclusively. Yet, it is to be understood that any suitable technique for interacting with a user representation may be used to initiate the respective action. An interaction technique related to hovering that is applicable in the method is disclosed in co-pending U.S. patent application Ser. No. 13/759,962, entitled "Timer-Based Initiation of Server-Based Actions," filed on Feb. 5, 2013, which claims the benefit of U.S. Provisional Application No. 61/595,619, filed on Feb. 6, 2012, the entire disclosures of which are incorporated herein by reference.

An "in place" chat may be started or any other activity may be initiated in response to the second user interacting with the user representation. Thus, the activity is directly initiated from the Live Profile of the first user. The first user may receive a notification about the initiated activity, which enables the first user to react appropriately. The notification may also specify further data, such as a location from where the second user started the video chat or initiated the activity, which may comprise an indication or link to a respective seed which has been presented in combination with the user representation, such as a post, activity, or other content of the first user.

The system may also delay the initiation of the activity, such as an enhanced activation of the Live Profile, for a certain amount of time when the second user interacts with the user representation. The system may, for example, delay the initiation by less than 500 milliseconds, preferably between 50 and 150 milliseconds, and most preferably by 100 milliseconds. For example, the initiation is delayed when the control device hovers over the user representation in order to avoid an initiation by mistake. Also, delaying the initiation may enable a user to automatically cancel the initiation if the related activation of a feature was not intended. For example, when a control device is moved over the Live Profile by a user, a delay may help to avoid initiation by mistake if the user intended to point to a different object on the screen.

In yet another embodiment, the method further comprises adding at least one further user interacting with a respective representation of the first user to the activity, the further user being authorized to access the live recording based on the access permissions. For example, the audio and video data of an "in place" chat between two users may be broadcasted to other users accessing a respective user representation or Live Profile of at least one of the users that are already involved in an "in place" chat. In order to participate in the "in place" chat, the other user may interact with the respective user representation. The online system may thereafter add the other user to the "in place" chat, enabling an instantaneous video conference between the users via the respective user representations. Similarly, the other user may also be added to any other interaction or activity, which has already been initiated between the other users, such as an online game or another group experience provided by the online system.

Preferably, the interaction automatically ends after a predetermined period of time. For example, an "in place" chat or any other activity can be limited, for example, to less than 1 minute, preferably to 10 to 50 seconds, and most preferably to 20, 30, or 40 seconds. The time limit can be pre-defined by the online system. Furthermore, the first user providing the live recording may set a time limit which applies to a respective activity initiated by interacting with his Live Profile. At the end of the activity, the involved users may be asked by the online system if they want to continue the activity or if they want to stop. In the former case, the initiated activity related to the Live Profile may be continued or may be upgraded to a full activity. For example, after an "in place" chat has been automatically terminated, the participants may be asked if they want to continue the chat as a dedicated video chat. The online system may be configured to only continue the activity if all participants agree. As an alternative, the online system may only continue the activity with those users that have agreed.

Preferably, the activity comprises at least one of a chat session, an online group experience, and an online game. However, it is to be understood that the present disclosure is not limited by a certain activity or action. Rather, any activity, action, or functionality provided by the online system may be initiated by interacting with a Live Profile.

According to another embodiment, the chat session is provided to the users as a full screen video chat session. Thus, two or more users who are currently using the Live Profile for an "in place" chat may, for example, continue in a full dedicated video chat after a certain period of time. Furthermore, both users may directly transform the current activity into a full functionality mode by triggering the Live Profile or the initiated activity. For example, the users may initiate a dedicated chat by clicking on the "in place" chat window to enlarge the video picture, wherein the dedicated chat may further show the user's own video frame and other features. Subsequently, the online system may be configured to stream audio exclusively to the participants of the dedicated video chat. Other users that, for example, hover their control device over the Live Profile of a user, who is currently in a dedicated video chat, may be provided with an image of the user instead of the Live Profile and may, for example, be provided with an indication or signal that the user is currently involved in a dedicated video chat.

In yet another representative embodiment, the method further comprises requesting a user identity of the first user by the second user; retrieving a status of the second user with regard to the first user; based on the status of the second user, determining a representation of the user identity; and, if the second user is authorized, including the live recording into the representation of the user identity, wherein said determining if the second user is authorized includes determining if the second user is authorized to access the live recording based on the permissions and the status. The representation of the user identity is therefore dependent on the requesting viewer and his or her affiliation to the first user. Thus, all users of the online system may create a user profile that allows for a recipient-targeted presentation of the user's identification. In particular, a user of the online system can appear within a consistent online system with different representations, wherein the online system uses the most appropriate representation for respective viewers or groups of viewers. The first user may directly affect the representations and modify the data with regard to the status of the second user. Thus, the representation of a user profile including the live recording is directly influenced by the first user. The inventive method allows for a flexible representation of the user identity to interested viewers without compromising the privacy of the data. It also allows for management of the Live Profile in an easy and transparent way.

In a further embodiment, said determining comprises associating at least one of two or more levels of privacy with the second user based on the status of the second user and the access permissions. A realization of a user identity related to several levels of privacy applicable in the method is disclosed in co-pending U.S. patent application Ser. No. 13/689,550, entitled "Privacy-Based Identity," filed on Nov. 29, 2012, which claims the benefit of U.S. Provisional Application No. 61/595,626, filed on Feb. 6, 2012, the entire disclosures of which are incorporated herein by reference. For example, a user may define certain displays of his names at different levels of privacy, such as invisible, anonymous, nickname, real name, full name, and "live" (e.g., a current status or live feed of the user's information). In addition, the user may define a corresponding display of his visual representation on the levels of privacy, such as a default picture, a nickname fantasy picture, a real photograph, and the live recording of the user.

According to a representative embodiment, the user identity comprises one or more elements, each element describing a characteristic of the first user, wherein at least some of the elements comprise two or more definitions related to different levels of privacy. Thus, a first element may describe a visual representation and a second element may comprise a representation of a name of the first user. Correspondingly, the first element may comprise definitions of images, real pictures, and/or the live recording provided by the first user. At least some of the definitions of each element may be combined in the representation of the user identity based on the level of privacy, wherein the live recording is only provided if the second user is authorized by the permissions and his status.

Preferably, the representation of the user identity comprises for each element of the user identity one of said definitions based on the level of privacy associated with the second user. For example, a user of a social network may create a profile with his real name and further define a nickname or a fantasy online name. Also, the user can assign a fantasy icon and a real photo of the user as a visual representation. In addition, the user may provide the live recording whenever the user is online. Based on the status of the viewer, a suitable representation may be selected, such as a combination of the real name and the live recording for registered users closely associated with the user.

According to a representative embodiment, said determining a representation of the user identity further comprises using a rule-based system to choose a representation of the user identity, said rule-based system including the access permissions. The first user may set options specifying who of the other users is allowed to view the live recording of the Live Profile and/or who is allowed to hear any related audio. The first user may also set where the Live Profile should be displayed, such as in his profile only, at any place where his profile icon would normally appear, etc. The rules may also include parameters related to the status of the second user and may further analyze additional information of the second user, such as the name of the second user or a network identification, if such data is available to the online system. The online system may provide a basic set of rules, settings, and access permissions and may enable the first user to modify the rules, settings, and permissions at any time.

Preferably, the first user modifies at least one rule of the rule-based system. Thus, in addition to the general levels of privacy and access permissions, the first user may set several independent rules for representation of his picture, name, and/or further data. The first user may, for example, define rules related to the user's friends or a subset of the user's friends (e.g., close friends), granting them access to the user's Live Profile and further data related to a highest level of privacy. The rules in combination with the access permissions may be used to generate an output vector that identifies, for each element of the user identity, a respective level of privacy. In particular, the online system may construct a permission table from the user settings, specifying who is allowed access to a live profile. This permission table may be used to stream the respective Live Profiles to the other users if they are authorized to access the Live Profile. In case of insufficient rights, a default image of the first user, e.g., a still picture or an icon, may be used instead of the live recording of the Live Profile.

Furthermore, a computer-readable medium (e.g., a non-transitory storage medium such as memory (volatile or nonvolatile), a hard disk, an optical disk (e.g., a rewritable or single-write optical disk), magnetic tape, etc.) according to the present disclosure has instructions stored thereon, wherein said instructions, when installed and executed on a computing device, cause said computing device to automatically perform a method according to an embodiment of the present disclosure. For example, the computer-readable medium may be accessed by an online system and the instructions may be transferred to at least one server hosting the online system that may execute the instructions. In particular, the instructions may cause the server to configure the online system to receive a live recording of a first user of the online system and to enable the first user to define permissions for accessing the live recording. Further the instructions may configure the online system to enable a second user of the online system to request a representation of the first user. In response to the request or during initial processing, such as a log-on of the second user, the online system may be configured to determine if the second user is authorized to access the live recording based on the permissions defined by the first user. If the second user is authorized, the online system may grant access to the live recording and provide the live recording to the second user as the representation of the first user.

An online system according to the present disclosure comprises a configuration module accessible by a first user of the online system configured to receive a live recording of the first user and enabling the first user to define permissions to access the live recording. The online system further comprises an input interface accessible by a second user of the online system enabling the second user to request a representation of the first user and a processing component configured to determine if the second user is authorized to access the live recording based on the permissions. In addition, the online system comprises an output interface accessible by the second user configured to provide the live recording to the second user as the representation of the first user if the second user is authorized.

The online system enables a live recording to be used as a representation of a user of the online system instead of static images or pictures. The system may provide a suitable interface, such as a browser-based interface or a dedicated application, which enables the first user to access the configuration module. The configuration module may be used to link the live recording with a server or another processing component of the online system and to enable a streaming of the respective media data. The live recording may be temporarily stored by the online system in a storage device, such as a streaming server or another component of the online system, and provided to authorized viewers. The architecture may follow a "one to many" principle, wherein the live recording of the representation of one user, also referred to as a "Live Profile," is provided to all authorized viewers, for example, by streaming the media stream of the live recording to all authorized viewers. Furthermore, the online system may implement a "many to one" approach, wherein the Live Profiles of a group of users are provided to a specific user, who has been granted access to the respective Live Profiles. The media streaming, such as audio and/or video streaming, is preferably based on any kind of suitable approach or streaming technique, such as a peer-to-peer network architecture, a one-server solution, or a server cloud solution.

The online system may further provide a platform enabling access to user-related content and providing actions and activities between users and content. Whenever a viewer tries to access content or other data related to a user, a representation of the user is requested and the online system determines if the viewer is authorized to access a representation of the user including the live recording by querying access permissions which have been set by the user.

The inventive system enables users to provide a highly detailed and personalized representation within the online system that, however, enables a high level of control by the provider of the live recording, i.e., the first user. Therefore, the user may define and directly control the group of users who are allowed to retrieve the detailed and personal data. The live recording enables authorized viewers to get instantaneous feedback on the status and reactions of online user. Thus, the representation provides detailed and realistic information about the respective user and greatly improves the usability and interactivity of the online system.

According to another embodiment, the output interface provides the live recording in an area representing a user icon of the first user.

In a representative embodiment, the processing component is further configured to initiate an activity between the first and second users if the second user interacts with the representation.

In a representative embodiment, said processing component is further configured to add at least one further user interacting with a respective representation of the first user to the activity, the further user being authorized to access the live recording based on the access permissions.

According to a representative embodiment, the processing component automatically terminates the activity after a predetermined period of time.

In yet another embodiment, the second user requests a user identity of the first user via the input interface, wherein the processing component is further configured to retrieve a status of the second user with regard to the first user and, based on the status of the second user, to determine a representation of the user identity, and if the second user is authorized, to include the live recording in the representation of the user identity, wherein said determining if the second user is authorized includes determining if the second user is authorized to access the live recording based on the permissions and the status.

According to a representative embodiment, said processing component is further configured to associate at least one of two or more levels of privacy with the second user based on the status of the second user and the access permissions.

In a further embodiment, said processing component is further configured to use a rule-based system to choose a representation of the user identity, said rule-based system including the access permissions.

According to a representative embodiment, the configuration module further enables the first user to modify at least one rule of the rule-based system.

According to another embodiment, the online system is a social network.

Furthermore, a data structure according to the present disclosure is provided, comprising an element describing a visual characteristic of the user, said element comprising two or more definitions, including a live recording of the user, wherein the live recording is accessible based on access permissions defined by the user. The data structure may be implemented using any suitable programming approach, such as an imperative, object-oriented, or functional programming paradigm. For example, the data structure may be implemented as a class, wherein instances of the class are used to represent the user in the online system. The respective data may be stored in a database or any other storage and used to populate the members of a respective instance. In particular, the data structure may comprise a link to a streaming component, which provides the live recording of the user, if the viewer is authorized to access the data. Yet, it is to be understood that different approaches also may be chosen to create the user representation, such as directly reading the data into dynamically generated sources for a web-based interface, such as a web page. Other techniques implementing the data structure and enabling the representation of the user may be used as well.

According to a representative embodiment, the data structure further comprises one or more elements, each element describing a characteristic of the user, at least some of the elements comprising two or more definitions of the respective characteristic, wherein each definition is related to a different level of privacy.

In yet another embodiment, a representation of the user comprises for each element of the data structure one of said definitions based on the access permissions and a level of privacy associated with another user of the online system requesting the representation.

DESCRIPTION OF THE DRAWINGS

Further details, aspects and characteristics of the present disclosure are described in exemplifying embodiments with reference to the figures of the accompanying drawings, in which.

DETAILED DESCRIPTION

Figure 1:
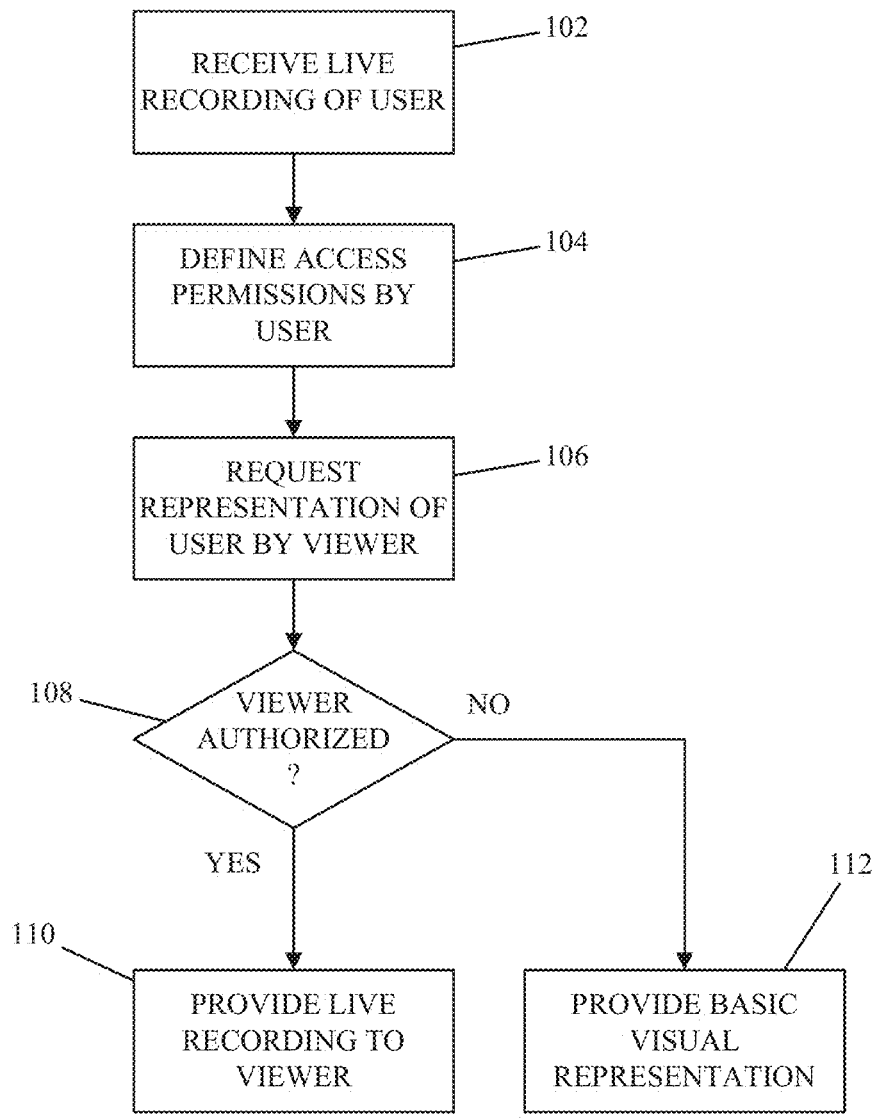
FIG. 1 shows a flow chart of a method according to an aspect of the present disclosure.

FIG. 1 shows a flow chart of a method for privacy-based representation of a user identity within an online system, according to an aspect of the present disclosure. The method 100 includes steps that may be automatically executed on a server hosting the online system or by some other device (e.g., a client device operated by a user) or combination of devices. A user may provide a live recording (e.g., via input to a device operated by the user) for a Live Profile, which is received (e.g., by the server hosting the online system) in step 102. The user may, for example, provide the live recording whenever he is online. The user may also define (e.g., via input to the device operated by the user) access permissions that specify other users or a group of viewers, which are authorized to access the Live Profile of the user, in step 104. The user may repeat step 104 and may modify or change the access permissions at any time. The user may also perform step 104 first and provide the live recording thereafter. For example, the user may register at the online system and may directly specify the access permissions. Subsequently, the user may log on to the online system and automatically provide a live recording. Also, step 104 may be omitted. In this case, initial settings or previously defined access permissions may be used.

In step 106, a representation of the user of the online system is requested by a viewer (e.g., via input to a device operated by the viewer). The viewer may, for example, access a profile of the user in the online system, which may display several data related to the identity of the user. The user identity may, for example, comprise a name and a visual representation of the user. The request is handled by the online system, which may retrieve the access permissions defined by the user in step 104. Based on the access permissions, the system determines in step 108, if the viewer is authorized to access the live recording. The system may, for example, determine a status of the viewer and query the access permissions for any rules related to the status of the viewer. For example, the user and the viewer may be linked as friends and the user may specify in the access permissions that all users with a "friend" status are authorized to access the live recording. Also, the user may directly specify an ID or name of another user, which is authorized to access the live recording. In this case, the online system matches the name of the viewer to all respective settings. In addition, the online system may consider further rules and settings and combine the data in order to determine the authorization of the viewer.

Based on the status, the system determines a representation of the user identity. Either the live recording is presented to the viewer as a Live Profile in step 110, or the viewer is presented a basic visual representation of the user in step 112, which may, for example, rely on a level of privacy of the viewer with regard to the user. For example, the basic visual representation of step 112 may comprise different definitions for respective levels of privacy, such as a default icon, cartoon-like images, or a real photograph or image of the user, which may be shown to viewers with an enhanced affiliation to the user, such as friends of the user or other closely affiliated users.

Even though method 100 has been described using examples of a basic visual representation of a user, it is to be understood that the representation of the user may also comprise further elements defining other characteristics of the user. Therefore, the present disclosure is not limited by a certain visual representation or certain characteristics of the user or viewer. Furthermore, even though a method according to an embodiment of the present disclosure has been described with reference to exemplifying embodiments, it is to be understood that particular processing steps may be modified, added, and omitted without leaving the scope of the present disclosure. Also, the processing steps may be performed in a different order from the examples described. For example, as discussed above, step 104 may be omitted and steps 102 and 104 may be executed in a different order. Also, steps 102 and 104 may be executed independently or concurrently to the other processing steps.

Figure 2:
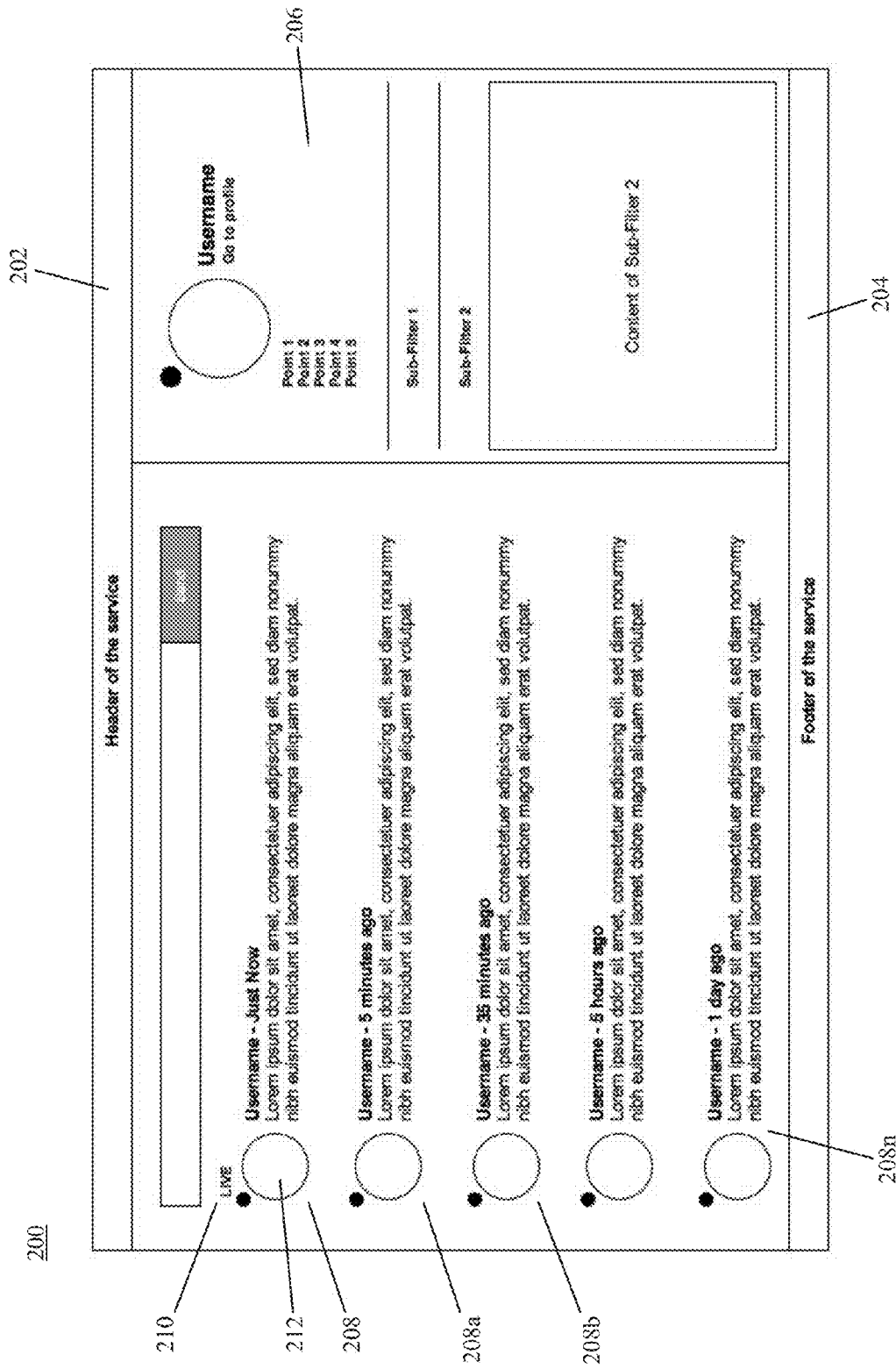
FIG. 2 illustrates a user interface including an output interface of an online system including a representation of a user according to an aspect of the present disclosure.

FIG. 2 illustrates a user interface including an output interface of an online system including a representation of a user according to an embodiment of the present disclosure. The user interface 200 is presented as a page of a social network, and may be configured to receive input (e.g., mouse actions, touch input, keyboard input, etc.) via an input interface and provide output (e.g., display of text, graphics, images, video, etc.) via an output interface. The page may comprise a header 202 and footer 204 providing information related to a currently used service of the social network. Furthermore, the page may comprise information about the user or viewer, providing a username and/or other identification, such as an image of the user, and various further services of the user, such as filters for content, in section 206. The output interface may show a list of content items 208, 208a, 208b ... 208n, representing content and activities provided by the online system, such as media files, posts, feeds, users, groups of users, and/or other content items. Each content item 208, 208a, 208b ... 208n may be represented by a seed, specifying a title of the content, a time or time range, a thumbnail representing the content, a representation of the related user, such as the user who has uploaded or posted the content, and other related data. If a user associated, for example, with the content item 208 provides a live recording, the Live Profile may be activated and the viewers may be notified, for example, by a visual indicator or icon 210 that notifies other users about availability of the Live Profile. If the viewer is authorized, a respective video stream may be shown instead of a static picture or another basic visual representation as the user icon 212. Hence, the user icon 212 is "live" and/or animated once the user initiates a streaming originating from his web cam or other camera. In particular, all moves and actions in front of the camera are captured and displayed in real-time instead of the static user icon.

Figure 3A:
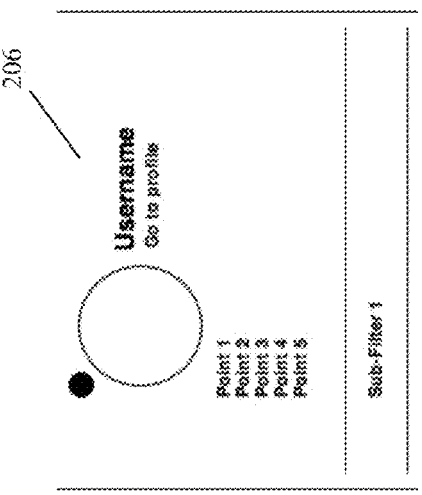
FIGS. 3A and 3B show a live user representation and an interaction with the user initiated by a viewer of the representation according to an aspect of the present disclosure.
Figure 3A:
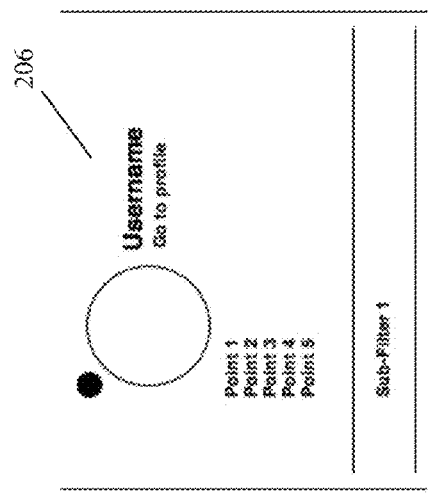
Figure 3B:
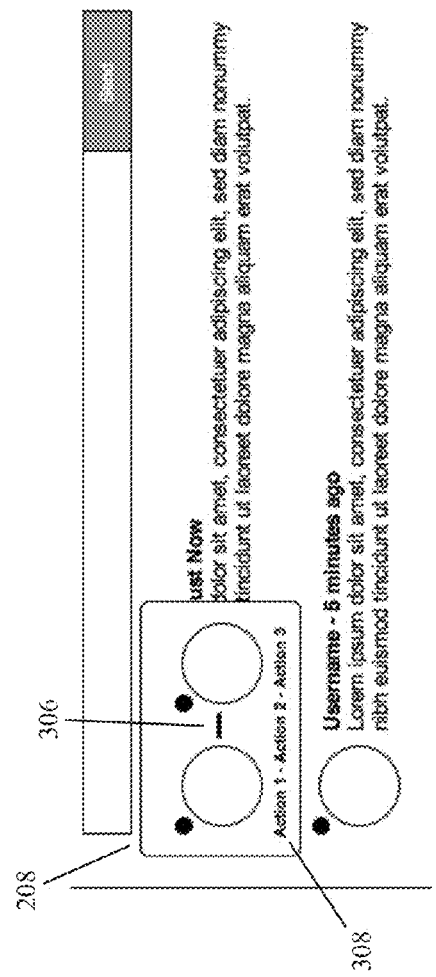
Figure 3B:
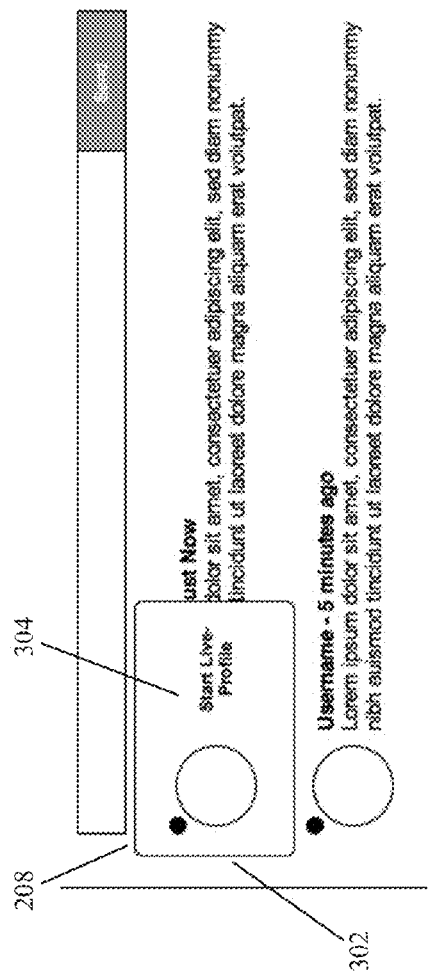

FIGS. 3A and 3B show a live user representation and an interaction with the user initiated by a viewer of the representation according to an embodiment of the present disclosure. The live user representation may, for example, be presented in combination with content item 208 of FIG. 2. Therefore, same or similar parts of FIGS. 3A and 3B have been designated with the same reference signs as in FIG. 2. The viewer may hover the mouse or another input device over the Live Profile icon 302 of another user. By hovering the mouse over the icon 302 a video chat option may appear which automatically starts an "in place" Live Profile chat. Also, the viewer may be required to confirm the start of the "in place" chat with the other user by clicking on a visual representation 304. As shown in FIG. 3B, if the "in place" Live Profile chat or live conference is being activated via mouse hover or another suitable interaction, the display may show both Live Profile video streams next to each other in an overlaid window 306. Window 306 may additionally show other available options 308, like changing the status of the video chat, expanding the "in place" chat to a dedicated video chat, which may, for example mute all other users, stopping the video chat, muting its own audio, etc.

Figure 4A:
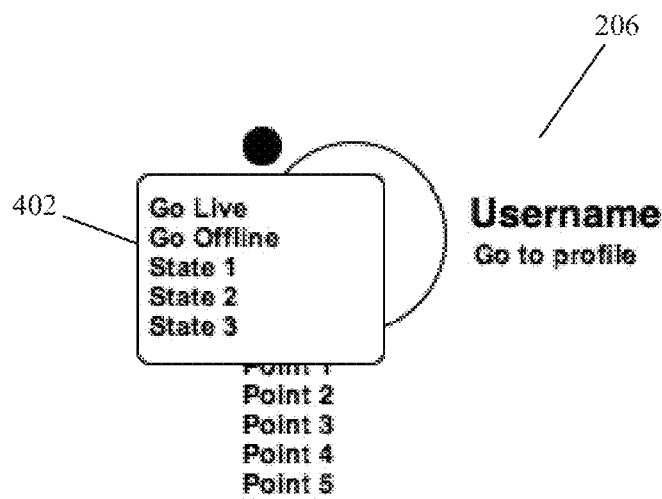
FIGS. 4A and 4B illustrate a configuration module enabling a live representation according to an aspect of the present disclosure.
Figure 4B:
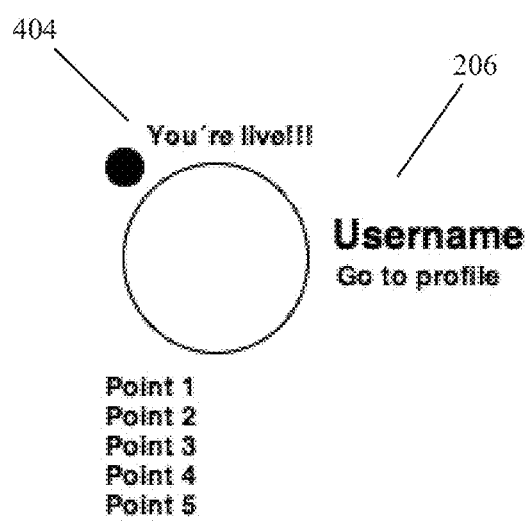

FIGS. 4A and 4B illustrate a configuration module enabling a live representation according to an aspect of the present disclosure. The configuration module may be, for example, provided as an extension to the section 206 of FIG. 2 that provides the personal information of the user or viewer. The configuration module may be used to manage several functions of the Live Profile. For example, the user may open a menu 402 with options to start the Live Profile, stop the live video stream, and select other available functions, like switching the state of the video stream, such as by changing settings related to quality settings, color themes, etc. Furthermore, menu 402 may be used to include a Live Feed in the live recording of the user or the live representation and/or manage a state of the user. Said Live Feed may be another recording initiated by the user provided to the system. Thus, a user may provide a plurality of live recordings to the system. For example, the user may decide to go offline, thereby terminating the live recording. As shown in FIG. 4B, the user icon may show a visual indicator 404 that notifies other users that a Live Profile is available. If a user switches from a static picture to a Live Profile icon, the online system may notify the user and all other users of the status change, for example, by the visual indicator 404 and icon 210 of FIG. 2, respectively. Preferably, a message and/or a notification symbol may be placed next to the Live Profile icon to display the change of the status.

Figure 5:
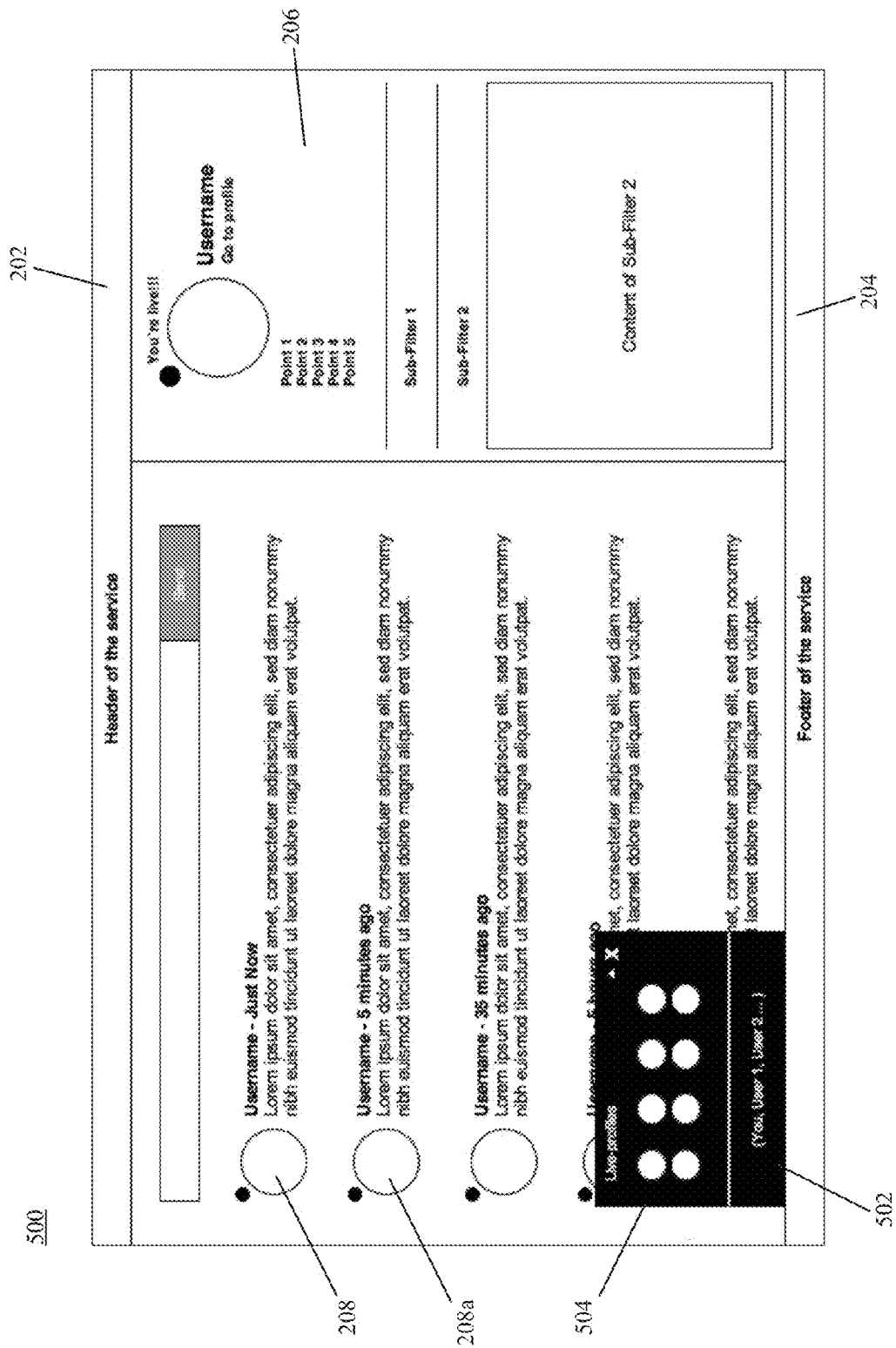
FIG. 5 illustrates a user interface including an output interface for a user including a summary of affiliated users that provide a live representation according to an aspect of the present disclosure.

FIG. 5 illustrates a user interface including an output interface for a user including a summary of affiliated users that provide a live representation according to an embodiment of the present disclosure. Similar to the user interface 200 of FIG. 2, the user interface 500 may be presented as a page of a social network. Therefore, same or similar parts of FIG. 5 have been designated with the same reference signs as in FIG. 2. In addition, user interface 500 includes a section 504 providing information about current activities in the social network related to the user. An implementation of the section 504, also referred to as a Live Bar, is applicable in the user interface 500 according to one or more embodiments disclosed in co-pending U.S. patent application Ser. No. 13/749,605, filed on Jan. 24, 2013, entitled "Live Bar," which claims the benefit U.S. Provisional Application No. 61/599,897, filed on Feb. 16, 2012, the disclosures of which are incorporated herein by reference. In particular, the social network may use a Live Bar to host all current activities related to the user. Within the Live Bar 502, a slot 504 may appear whenever a Live Profile is used. The slot 504 may show the Live Profiles of associated users. For example, the Live Bar 502 may show the Live Profiles of other users that are actively chatting with the user, for example, via their Live Profiles. The other users may drop in and out of the slot 504 as they hover their mouse or input device over the respective icon of the user.

Figure 6:
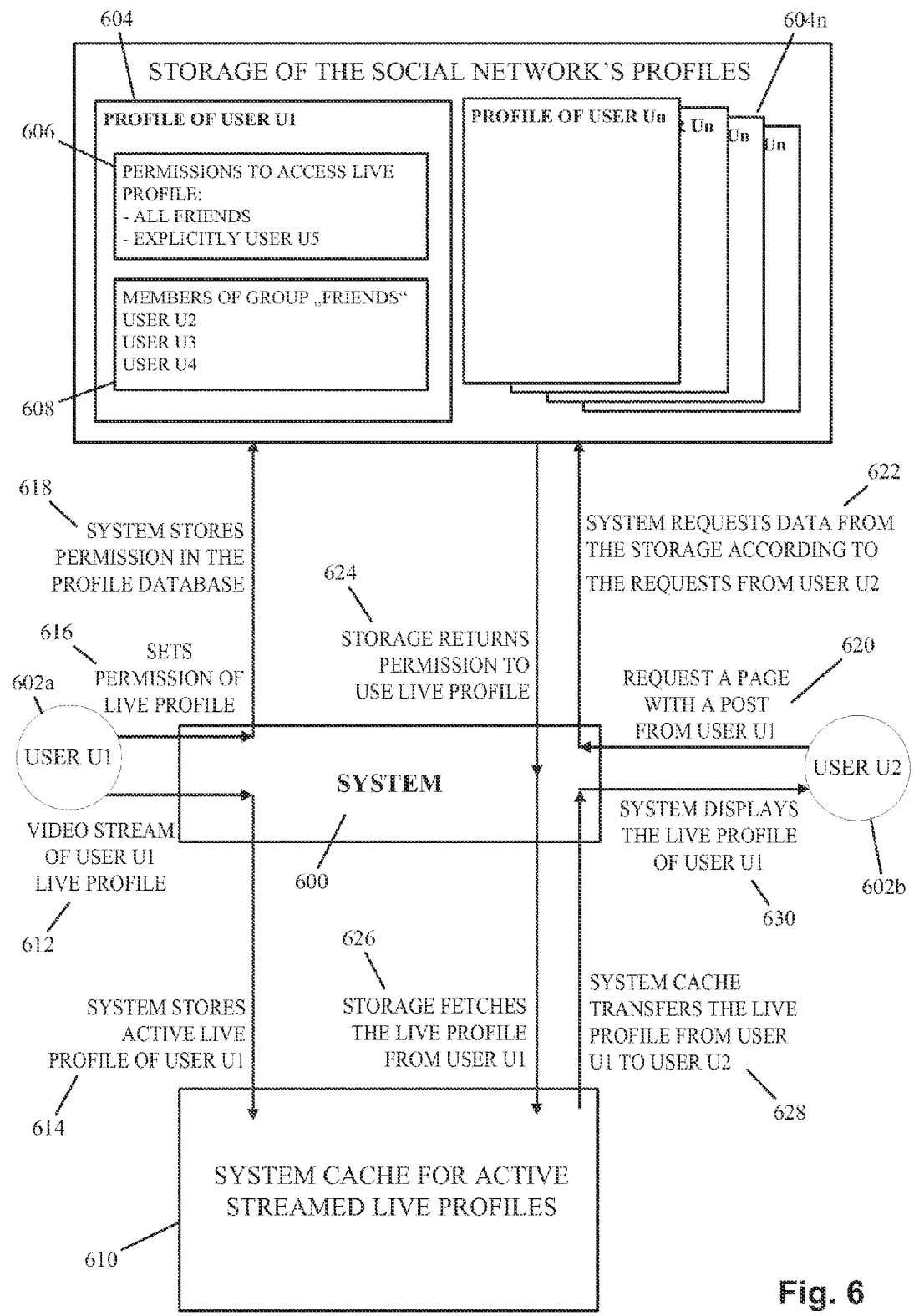
FIG. 6 illustrates a schematic representation of an online system configured to implement one or more aspects of the present disclosure.

FIG. 6 illustrates a schematic representation of an online system enabling live representation of users according to an embodiment of the present disclosure. Furthermore, FIG. 6 illustrates a schematic representation of a data structure according to an embodiment of the present disclosure, in combination with retrieval of a representation of the user identity. An online system 600 according to an embodiment may store for each user, such as users 602a, 602b, a user profile 604, 604n. Each user profile 604, 604n may include a definition of access permissions 606, which specify individual users or a group of users that are authorized to access the Live Profile of the respective user. For example, the access permissions may define that all users with a "friend" status and explicitly a user U5 are granted access to the live recording of the Live Profile of the user. In addition, the user profile 604, 604n may store several groups 608 of other users defining a certain affiliation with these users, such as colleagues, business associates, friends, close friends, and others. The system 600 may further comprise a storage 610, such as a cache or buffer, in order to temporarily store the media data related to each Live Profile. The system 600, database storing the profiles 604, 604n, and the storage 610 may be hosted by a single processing component. Alternatively, the system 600, database, and the storage 610 may as well be hosted by separate processing components, which may be interconnected by a network or another suitable communication link. Also, the system 600 may provide a plurality of decentralized processing components for storage 610 related, for example, to a geographical distribution of users 602a, 602b. Other configurations of system 600 and related components may be used as well and the present disclosure is not restricted to a particular setting of system 600 and related components.

The system 600 may receive 612 a media stream provided by user 602a, and buffer 614 the media stream in storage 610. User 602a may also define 616 access permissions that specify the group of users authorized to access the Live Profile. The system 600 may store 618 the access permissions in the user profile 604 of user 602a, for example, in a profile database.

The respective media stream is provided to authorized viewers requesting the Live Profile, such as user 602b. For example, user 602b may request 620 a certain page from the social network that contains a post created by user 602a, wherein the profile icon of user 602a is connected to the post. Depending on the permissions defined by user 602a with regard to user 602b the displayed profile icon may be presented as the Live Profile or just as a basic visual representation, including, for example, a static picture of user 602a. In order to determine the authorization of user 602b, the system 600 may compare the request from user 602b with the stored permissions 606 in the database of the social network, specifically in the profile 604 of user 602a. The Live Profile may, for example, be permitted to be sent to all friends of user 602a. Hence, the system 600 may request 622 the related data from the database and may receive 624 the results. Based on the returned values, if it is, for example, determined that user 602b belongs to friends of user 602a, user 602b will be authorized by the system 600 and access to the Live Profile is granted. The system 600 may retrieve 626 the Live Profile from the storage 610 and may start streaming 628 the cached live recordings of the Live Profile of user 602a to user 602b, wherein the Live Profile will be embedded 630 in the page requested in step 620.

Even though the system 600 and related components according to an example embodiment of the present disclosure have been described using a particular processing method and processing order, it is to be understood that the system 600 may be operated in a different way without leaving the scope of the present disclosure. In particular, individual processing steps may be modified, added, and omitted. Also, the processing steps may be performed in a different order from the examples described.

According to an example embodiment of the present disclosure, which may be provided by an online system, such as system 600 of FIG. 6, a user U1 may enable his web camera and the Live Profile functionality within the online system. The user U1 may allow all of the user's friends, e.g., all users in a group called "friends," to see the Live Profile and to interact with it. Yet, depending on factors such as access permissions and/or privacy settings, access to the Live Profile can be controlled such that no other user of the online system may retrieve the Live Profile of user U1. As discussed in detail above, depending on a status of a particular viewer with regard to user U1 and an associated level of privacy, a different visual representation of an icon of user U1 may be shown to the viewer.

Furthermore, according to an example embodiment of the present disclosure, another user U1 may activate his Live Profile. In contrast, user U2 may deactivate his Live Profile; user U2 may, however, have equipment, such as a web camera and a microphone connected to his terminal device, such as a personal computer, which is capable of providing a live recording of user U2. For example, the equipment may be disabled by software. User U2 may navigate in a social network to a profile of user U1. Both users may be connected and may mutually allow viewing of each other's Live Profile, according to respective access permissions and privacy settings. In the example, user U2 can see the Live Profile of user U1 as shown, for example, in FIG. 2. User U2 may hover his mouse over the Live Profile of user U1 and, as the social network system recognizes the interaction as a wish to start an "in place" chat, the system may ask user U2 if he wants his web cam and microphone to be activated automatically. Alternatively, the system may inform user U2 that in order to activate the "in place" chat, he needs to activate the equipment manually. As soon as the equipment of user U2 is activated, the "in place" chat may start as shown, for example, in FIG. 3B.

Both users may communicate with each other. In addition, this conversation may be accessible by other users if they have the permissions to see the respective Live Profile. In particular, the "in place" chat may be a non-exclusive chat to the members of the "in place" chat. After a short initial communication, both users may agree to start a dedicated chat. For example, both users may trigger the "in place" chat representation to enlarge the video chat and to create a dedicated video chat room. The dedicated chat may be an exclusive communication between the participating users and other users will not be able to follow the conversation. Furthermore, the representation of the user U1 may change to a basic visual representation even for other users who have the permissions to access the Live Profile. For example, the representation may change to an icon signaling that user U1 is currently involved in a full video chat with user U2.

In yet another exemplary embodiment, a user may directly retrieve a status of several connected users from a status bar. User U1 may connect to a social network and may open a status bar, such as the Live Bar 502 of FIG. 5, that shows all his friends that are currently online. Furthermore, user U1 may enable his Live Profile. In the status bar, the status of three friends, such as users U3, U4, and U5, may be shown as "online," all of them having their Live Profiles enabled. User U1 may directly see his friends in front of their personal computers or other suitable devices via their Live Profiles. User U1 may hover his mouse over the Live Profile of one of his friends, for example, user U3, to automatically initiate an "in place" chat in order to greet him. Similarly, user U4 may hover his control device over the Live Profile of user U1. Hence, the system may automatically connect user U4 to the current video and audio stream of user U1, which enables him to listen to the ongoing conversation between users U1 and U3, although he may only be enabled to hear user U1, as this is the Live Profile he is hovering over. User U4 may ask user U1 if he wants to start a group video chat together with user U3. User U1 may agree and, as user U3 cannot hear the proposal of user U4, may forward the question to user U3. All three users may agree and join the same group video chat, enabling them to communicate with each other. Yet, other users, such as user U5, possibly observing the Live Profiles of any of the users U1, U3, and U4, may be excluded from the conversation.

The embodiments of the present disclosure detail an approach for providing a live recording, such as a live video stream, also referred to as a Live Profile, in place of a static visual representation of the user, such as an image or a profile icon in a social network environment. A viewer observing the Live Profile may interact with a related media stream, for example, to start an activity, such as a video chat. The present disclosure enables users to interact and communicate with each other ad hoc in a very fast way. The online system according to an embodiment may allow for a customized permission system to transparently organize who can and who cannot access the Live Profile, thereby creating a high level of data security and integrity enabling a strong data privacy protection.

Even though the processing and data structures of system 600 have been described in connection with examples specifying certain names and identities of users, it is to be understood that the present disclosure is not limited to particular exemplary user characteristics, levels of privacy, and visual representations of a user identity. Rather, particular features and components of the examples may be omitted and/or features and components of other examples may be added. Also, it is to be understood that further modifications may be provided to the example embodiments without leaving the scope of the disclosure. Hence, the embodiments of the disclosure may be practiced within the scope of the claims differently from the examples described and the described features and characteristics may be of importance for the embodiments in any combination.

The invention claimed is:

1. A method for representing a user within an online system, comprising:
   receiving by the online system a live recording of a first user of the online system as a live media stream, the first user defining permissions to access the live recording;
   receiving a request for a representation of the first user from a second user of the online system;
   determining if the second user is authorized to access the live recording based on the permissions;
   if the second user is authorized, providing the live recording to the second user as the representation of the first user;
   enabling an interaction between the first and the second user in that the first and second users can see or hear each other, thereby providing an instantaneous interaction between the first user and the second user;
   adding at least one further user interacting with a respective representation of the first user to an activity between the first and second users, the further user being authorized to access the live recording based on the access permissions while only being enabled to hear the first user;
   requesting a user identity of the first user by the second user;
   retrieving a status of the second user with regard to the first user;
   based on the status of the second user, determining a representation of the user identity; and
   if the second user is authorized, including the live recording in the representation of the user identity, wherein said determining if the second user is authorized includes determining if the second user is authorized to access the live recording based on the permissions and the status.

2. The method of claim 1, wherein the live recording is provided in an area representing a user icon of the first user.

3. The method of claim 1, further comprising:
   initiating the activity between the first and second users in response to an interaction of the second user with the representation, wherein said interaction comprises at least one of clicking on the representation and hovering over the representation.

4. The method of claim 3, wherein the activity automatically ends after a predetermined period of time.

5. The method of claim 1, wherein said determining a representation of the user identity comprises associating at least one of two or more levels of privacy with the second user based on the status of the second user and the access permissions.

6. The method of claim 5, wherein the user identity comprises one or more elements, each element describing a characteristic of the first user, wherein at least some of the elements comprise two or more definitions related to different levels of privacy, and wherein the representation of the user identity comprises for each element of the user identity one of said definitions based on the level of privacy associated with the second user.

7. The method of claim 1, wherein said determining a representation of the user identity comprises using a rule-based system to choose a representation of the user identity, said rule-based system including the access permissions, wherein at least one rule of the rule-based system is modifiable by the first user.

8. A computer system comprising one or more computers with non-transitory computer-readable media having stored thereon computer-executable instructions configured to cause the computer system to:
   receive a live recording of a first user as a live media stream and enable the first user to define permissions to access the live recording;
   receive a request for a representation of the first user from a second user;
   determine if the second user is authorized to access the live recording based on the permissions;
   provide the live recording to the second user as the representation of the first user if the second user is authorized;
   enable an interaction between the first and the second user in that the first and second users can see or hear each other, thereby providing an instantaneous interaction between the first user and the second user,
   add at least one further user interacting with a respective representation of the first user to an activity between the first and second users, the further user being authorized to access the live recording based on the access permissions while only being enabled to hear the first user;
   receive a request from the second user for a user identity of the first user;
   retrieve a status of the second user with regard to the first user;
   based on the status of the second user, determine a representation of the user identity; and
   include the live recording in the representation of the user identity if the second user is authorized,
   wherein said determining if the second user is authorized includes determining if the second user is authorized to access the live recording based on the permissions and the status.

9. The computer system of claim 8, wherein the instructions are further configured to cause the computer system to initiate the activity between the first and second users if the second user interacts with the representation.

10. The computer system of claim 9, wherein said interaction comprises at least one of clicking on the representation and hovering over the representation.

11. The computer system of claim 9, wherein said instructions are further configured to cause the computer system to:
   automatically terminate the activity after a predetermined period of time.

12. The computer system of claim 10, wherein the activity comprises at least one of a chat session, an online group experience, and an online game.

13. The computer system of claim 12, wherein the chat session is a full screen video chat session.

14. The computer system of claim 8, wherein said instructions are further configured to cause the computer system to associate at least one of two or more levels of privacy with the second user based on the status of the second user and the access permissions.

15. The computer system of claim 14, wherein the user identity comprises one or more elements, each element describing a characteristic of the first user, wherein at least some of the elements comprise two or more definitions related to different levels of privacy, and wherein the representation of the user identity comprises for each element of the user identity one of said definitions based on the level of privacy associated with the second user.

16. The computer system of Claim 8, wherein said instructions are further configured to cause the computer system to use a rule-based system to choose a representation of the user identity, said rule-based system including the access permissions.

17. The computer system of claim 8, wherein the computer system is a social network.

18. A non-transitory computer-readable storage medium having stored thereon computer-executable instructions configured to cause a computer system to:
    implement a data structure representing a first user of an online system, wherein the data structure comprises:
        an element describing a visual characteristic of the first user; and
        said element comprising two or more definitions, including a live recording of the first user,
    wherein the live recording is provided as a live media stream and accessible based on access permissions defined by the first user;
    enable an interaction between the first user and a second user in that the first and second users can see or hear each other, thereby providing an instantaneous interaction between the first user and the second user;
    add at least one further user interacting with a respective representation of the first user to an activity between the first and second users, the further user being authorized to access the live recording based on the access permissions while only being enabled to hear the first user;
    receive a request from the second user for a user identity of the first user;
    retrieve a status of the second user with regard to the first user;
    based on the status of the second user, determine a representation of the user identity; and
    include the live recording in the representation of the user identity if the second user is authorized,
    wherein said determining if the second user is authorized includes determining if the second user is authorized to access the live recording based on the permissions and the status.

19. The computer-readable storage medium of claim 18, wherein the data structure further comprises one or more elements, each element describing a characteristic of the user, at least some of the elements comprising two or more definitions of the respective characteristic, wherein each definition is related to a different level of privacy, wherein a representation of the user comprises for each element of the data structure one of said definitions based on the access permissions and a level of privacy associated with another user of the online system requesting the representation.

* * * * *